United States Patent [19]

Whitney

[11] 4,243,239
[45] Jan. 6, 1981

[54] CATAMARAN DOLLY

[76] Inventor: Russell A. Whitney, 1350 River Reach Dr., Apt. 102, Fort Lauderdale, Fla. 33315

[21] Appl. No.: 947,267

[22] Filed: Sep. 29, 1978

[51] Int. Cl.³ .......................... B60P 3/10; F16C 19/46
[52] U.S. Cl. .......................... 280/47.13 B; 280/414 A; 308/215; 308/DIG. 8; 308/DIG. 9
[58] Field of Search ........ 280/414 A, 414 R, 47.13 B; 9/1.2; 308/204, 210, 215, DIG. 7, 202, 209, 208, DIG. 9

[56] References Cited

U.S. PATENT DOCUMENTS

| | | | |
|---|---|---|---|
| 1,207,449 | 12/1916 | Vogel | 308/210 |
| 2,406,069 | 8/1946 | Freeman | 308/215 X |
| 3,993,324 | 11/1976 | Carrick | 280/414 R |
| 4,010,962 | 3/1977 | Groblebe | 280/414 R |

FOREIGN PATENT DOCUMENTS 779243  7/1957  United Kingdom .............. 308/DIG. 9

OTHER PUBLICATIONS

CAT TRAX, Hobbie Hot Line, Jul.-Aug. 78, p. 24.
Cat-A-Puller, Hobbie Hot Line, Nov.-Dec. 76, p. 6.
Terra-Tires, SAE Journal, Mar. 59, p. 13.

Primary Examiner—John A. Pekar
Attorney, Agent, or Firm—Oltman and Flynn

[57] ABSTRACT

The present dolly for catamarans has soft-walled, inflatable tires which expand axially under load to keep the load pressure on each tire not more than 2 psi where the tire tread engages the ground. Self-lubricating needle bearings are engaged between each ground wheel and a hollow axle. The axle is covered by rubber sleeves axially outboard of the tires. Annular hull chocks are attached to the opposite ends of the axle, and each chock has a convex inboard face which is covered with outdoor carpeting. A flexible line extends through the axle and beyond the axle at each end for releasable attachment to the catamaran hulls.

12 Claims, 7 Drawing Figures

CATAMARAN DOLLY

SUMMARY OF THE INVENTION

Various doollies for transporting and launching small water craft have been proposed heretofore, such as those disclosed in the following U.S. Pat. Nos.: Flower 1,109,520; Reid 2,478,424; Iorns 2,484,346; Newell 2,551,040; Smith 2,578,376; Holsclaw 2,626,072; Corey et al 3,098,245; Malcolm 3,301,571; Reagan 3,445,018; Wolfe 3,499,177; Abbott 3,687,476; Carn 3,771,809; Gilster 3,857,128; Rudder 3,902,741; and Brockelsby 3,986,723.

The present invention is directed to a dolly for transporting and launching catamarans.

One of the problems with previously proposed dollies for catamarans was their tendency to become bogged down in soft sand because of excessive weight per unit of area of their ground wheels in contact with the ground. The present invention overcomes this difficulty by providing inflatable tires of low pressure, soft walled construction which are readily expandable axially where they engage the ground, so as to provide a greatly increased tire area in engagement with the ground, when the weight of the catamaran is supported by the dolly.

Another feature of the present invention is the provision of needle bearings of self-lubricating material between the ground wheels and the axle of the dolly. Preferably, retaining rings are pinned to the axle at the opposite ends of the needle bearings to protect them from sand, dirt or other foreign matter.

Axially outboard of the wheels the dolly axle preferably is covered by sleeves of rubber-like material which is resistant to abrasion, sun, sand and coral.

Also, preferably, the axle carries annular chocks at each end which have convex axially inboard faces covered with a relatively soft, yieldable material, such as outdoor carpeting, to prevent damage to the corresponding hull of the catamaran.

The axle of the dolly is hollow, and a flexible line extends through and beyond the axle at each end for attachment to the outside of the hulls of the catamaran to hold it on the dolly.

A principal object of this invention is to provide a novel and improved dolly for transporting and launching a catamaran.

Another object of this invention is to provide such a dolly which is more practical for use on soft sand or uneven ground than previously proposed devices for the same general purpose.

Another object of this invention is to provide a novel catamaran dolly which requires virtually no maintenance despite its exposure to sand, dirt, sun and salt water.

Another object of this invention is to provide a novel catamaran dolly which is constructed to avoid damage to the catamaran hulls when transporting the catamaran over uneven ground.

Further objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 1:
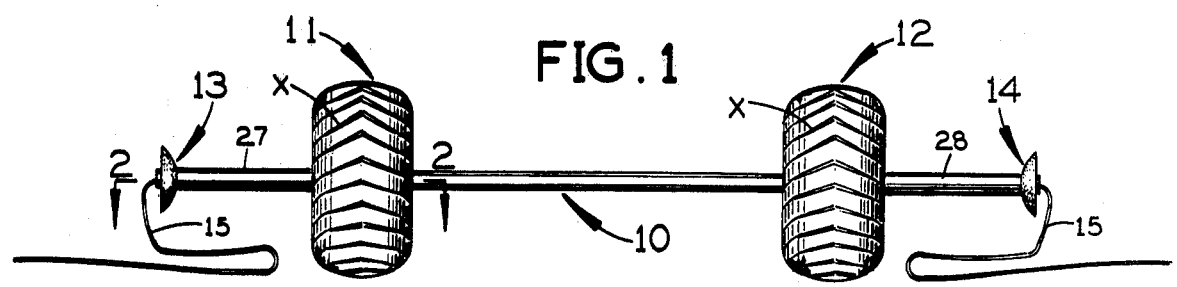
FIG. 1 is a front elevation of the present dolly.
Figure 5:
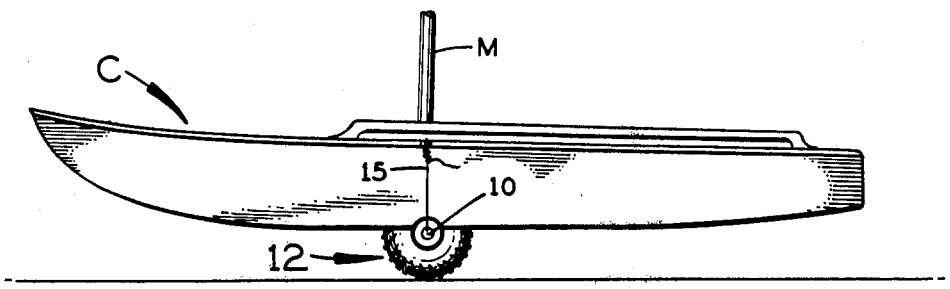
FIG. 5 is a view similar to FIG. 4 but with the catamaran on the dolly.
Figure 6:
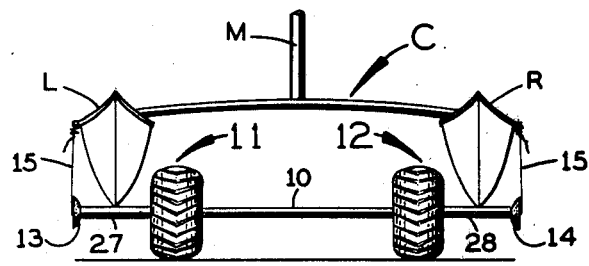
FIG. 6 is a front elevation of the dolly and catamaran assembly shown in FIG. 5.

Referring to FIG. 1, in broad outline the present dolly comprises an elongated, hollow axle 10, a pair of ground engaging wheels 11 and 12 spaced apart along the axle, a pair of hull chocks 13 and 14 fastened to the axle at its opposite ends, and a flexible line 15 extending lengthwise through the axle and beyond it at each end. As shown in FIGS. 5 and 6, this dolly supports a catamaran C having laterally spaced left and right hulls L and R, which rest on the dolly axle axially outboard of the ground wheels 11 and 12. The line 15 is drawn taut and its opposite ends are tied to these hulls.

Figure 2:
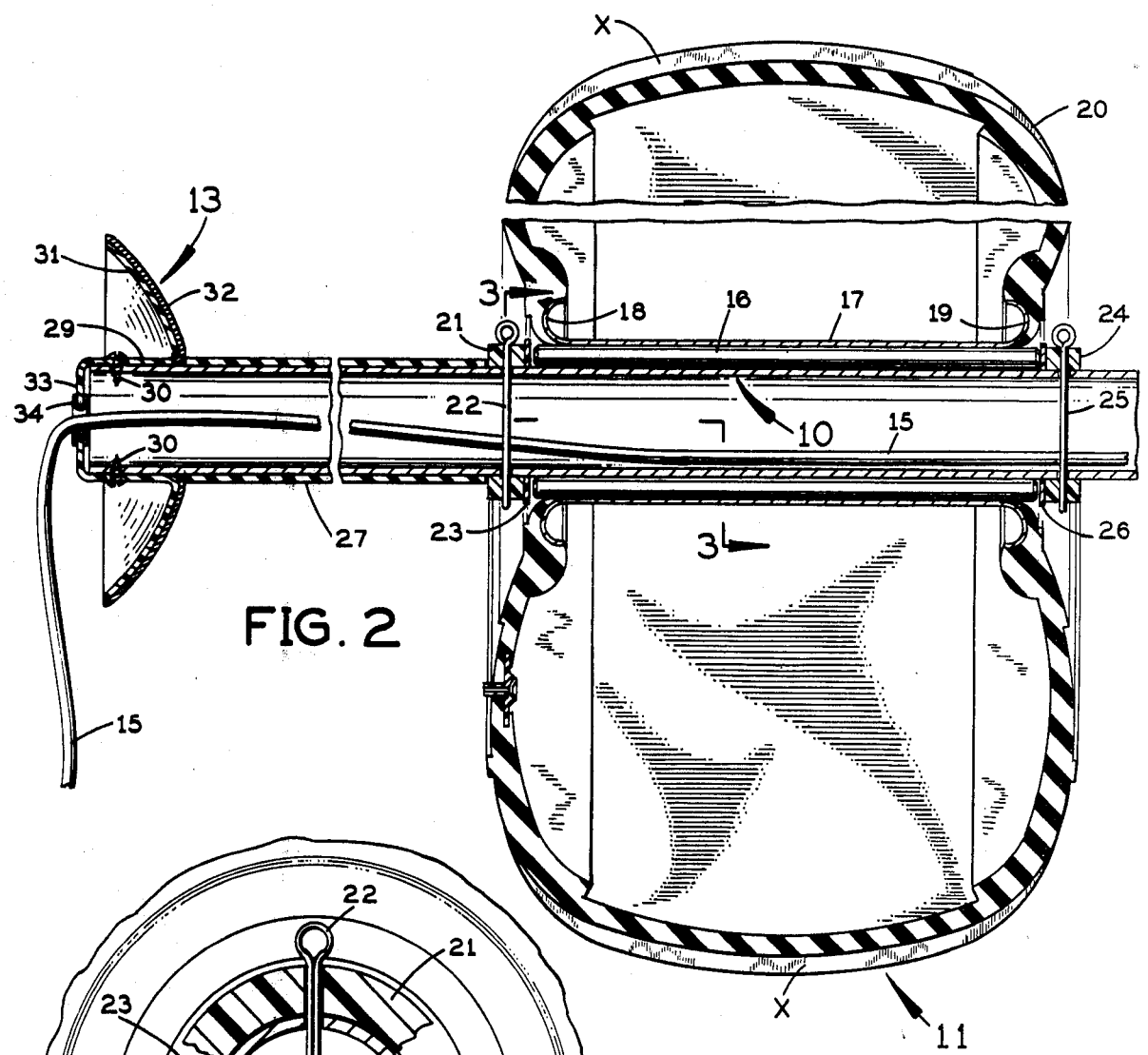
FIG. 2 is an enlarged fragmentary, longitudinal section taken along the line 2—2 in FIG. 1.
Figure 3:
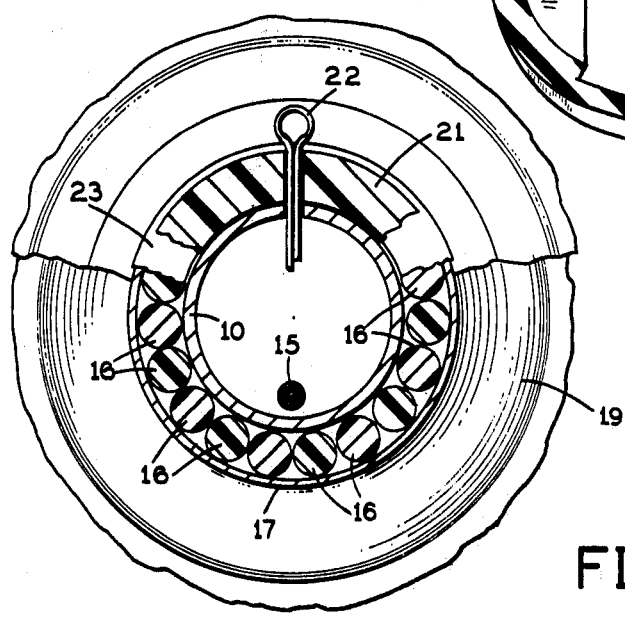
FIG. 3 is a vertical cross-section taken along the line 3—3 in FIG. 2.

Referring to FIG. 2, the axle 10 preferably is a thick-walled elongated cylinder of aluminum. The outside of the axle provides the innner race of an anti-friction bearing having a plurality of elongated bearing needles 16 of suitable self-lubricating material, such as "Delrin" or nylon. The outer race of this needle bearing is provided by the cylindrical inside face of the rim 17 of wheel 11. The wheel rim has convex, outwardly turned, opposite ends 18 and 19 which are sealingly engaged by the inner periphery of an inflatable tubeless rubber tire 20. The bearings wear on the metal races and the plastic accumulates on the races so that the bearings are self lubricating.

The tire 20 is designed for a low inflation pressure preferably less than five pounds per square inch. It may be constructed entirely of rubber or rubber-like material with few or no reinforcing cords in its sidewalls. The tire is of soft-walled construction which enables it to bulge axially under load so as to increase the tread area which contacts the ground, more or less in proportion to the weight supported by the tire.

The right-hand tire on the dolly is of the same construction.

In accordance with the present invention, the load pressure on the tread area of each tire in contact with the ground should be less than two pounds per square inch. This is necessary for the dolly to move readily over soft sand, coral or rocky beaches. For example, if the weight of the dolly and the catamaran, fully loaded, is 450 pounds, the two tires must have a tread area of at least 225 square inches contacting the ground.

In the preferred embodiment of the invention, the tire area in contact with the ground when only the weight of the dolly (about 46 pounds) is on the tires is almost 200 square inches, and when the load weight is increased to 450 pounds the combined area of the two tires in contact with the ground is about 300 square inches. This increase in the tire area contacting the ground is due to the "billowing" or axial bulging of the tire in response to the increased weight load on it.

Preferably, each tire is a Firestone "ATV" tire, size 21-12×8, which provides a clearance of 7½ inches above the ground at the end chocks 13 and 14 on the axle when there is no load on the dolly. This has been proved to be the optimum clearance to avoid dragging the axle when either tire drops into a depression in the ground and to position the axle low enough to conveniently load a catamaran on the dolly. The minimum tread width of the tire (i.e., when it supports only the weight of the dolly) is about 9 inches and its maximum tread width (when fully loaded by the catamaran) is about 14 inches.

As shown in FIGS. 1 and 2, each tire is formed with chevron-shaped, outwardly projecting ribs X, with the apex of each rib at the centerline of the tire tread and arranged circumferentially of the tire as the trailing part of the rib. That is, as the tire rolls over the ground, each chevron rib engage the ground first at the opposite axial ends of the tire, and then the ground is engaged progressively along the rib from its opposite ends inward toward its apex as the tire rolls forward. This rib design substantially overcomes the tendency for sand or other loose particles to form a dam or wall in front of the tire as it rolls on the ground.

As shown in FIG. 2, at the axially outboard side of the tire a retainer ring 21 is held in place snugly encircling the axle 10 by a cotter pin 22, which extends diametrically through aligned openings in this ring and the axle. A flat circular washer 23 on the inboard face of ring 21 is in closely spaced, confronting relationship to the outer ends of the bearing needles 16.

Similarly, at the axially inboard side of this line a retainer ring 24 is fastened to the axle by a cotter pin 25 and it carries a flat circular washer 26 in closely spaced, confronting relationship to the axially inboard ends of the bearing needles 16.

These retainer rings and washers limit the end thrust movement of needles and shield them from the entry of sand, dirt or other foreign particles, and the self-lubricating nature of the bearing needles 16 substantially prevents any such particles as do get into the bearing from interfering with its anti-friction operation.

The other tire 12 has an identical shielded needle bearing arrangement mounting it on the axle 10.

Axially outboard of the two tires the axle carries protective sleeves 27 and 28, respectively, each preferably of all-rubber, high pressure hose which meets U.S. Navy specifications and is resistant to abrasion and the sun and is substantially impregnable to sand and coral. As shown in FIG. 2, the sleeve 27 fits closely around the outside of the axle, and this is also true of the other sleeve 28. As shown in FIG. 6, these sleeves cushion the bottom of each catamaran hull when the dolly is transporting the catamaran over ground which may be uneven.

The hull chocks 13 and 14 are located at the axially outboard ends of the respective sleeves 27 and 28. Each hull chock presents an axially inboard face which is convex. As shown in FIG. 2, the chock 13 has a cylindrical stem 29 with a sliding fit on the axle and fastened to the axle by sheet metal screws 30. At the axially inboard end of this stem, the chock presents a dish-shaped, annular, transversely outward projecting segment 31 whose convex inner face is covered with yieldable material 32, preferably outdoor carpeting. This dish-shaped, annular segment of the chock is deformable and resilient, so that it will flex if the catamaran hull is accidentally dropped on it but will spring back when the hull is removed. The axially outboard end of the stem 29 is joined integrally to a radially inturned flange 33 which extends across the end of the axle. This flange has a central opening at which an annular metal grommet 34 is located. This grommet presents a rounded inner edge to protect the line 15, which passes through the grommet into the hollow axle 10.

The chock 14 at the opposite end of the axle is a mirror image of chock 13 and therefore need not be described in detail.

Figure 4:
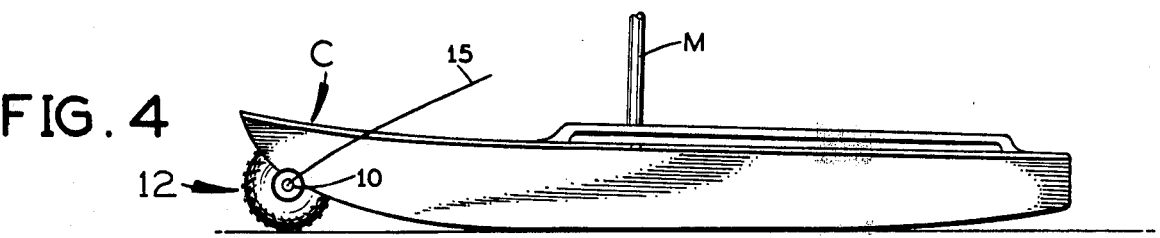
FIG. 4 is a side elevation of the present dolly and a catamaran which is about to be carried by the dolly.

FIGS. 4 and 5 illustrate the manner in which the catamaran can be slid onto the present dolly on the ground from the starting position of FIG. 4 to the mounted position of FIG. 5 in which the axle 10 of the dolly passes substantially directly below the mast M of the catamaran. The line 15 is pulled taut and its opposite ends are fastened to the outside of the catamaran hulls L and R, as shown in FIG. 6. The catamaran can be pushed or pulled across the ground while on the dolly.

For longer catamarans, two of the present dollies may be used to support the hulls from below at different locations fore and aft of the mast.

When loading or unloading a catamaran onto or from the dolly on land, the needle bearings enable the axle 10 to rotate freely while the wheels are stationary, so that the catamaran hulls can slide on or off the dolly while the dolly itself is stationary. The rubber sleeves 27 and 28 on the axle engage the catamaran hulls frictionally at this time so that sliding the catamaran over these sleeves will produce corresponding rotation of the axle 10 while the tires are stationary.

Figure 7:
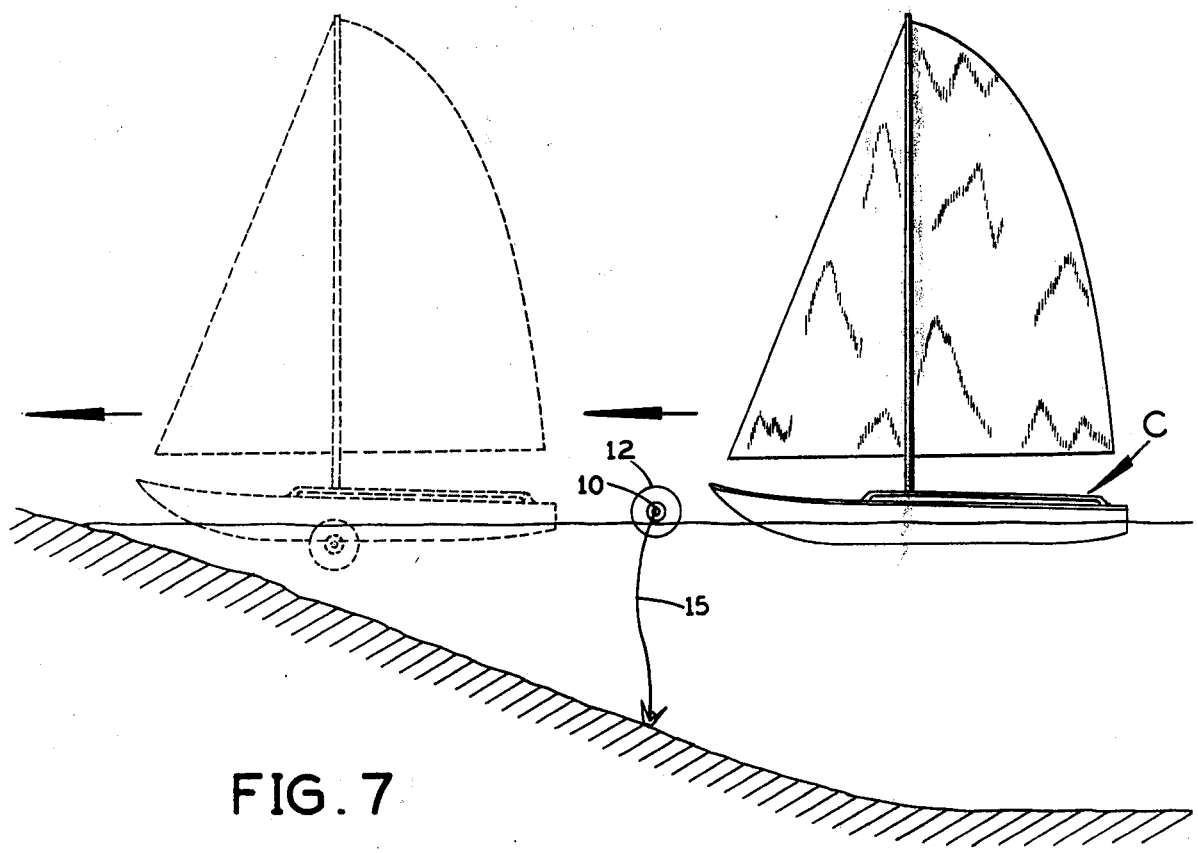
FIG. 7 shows in phantom the dolly and catamaran assembly before and after the catamaran is put on the dolly in water.

As shown in FIG. 7, the present dolly has substantial buoyancy in water so that the catamaran can be removed from, or placed on, the dolly while it is floating in the water.

I claim:

1. In a dolly for a catamaran, said dolly having an axle and a pair of ground wheels having rims spaced apart along said axle, the improvement wherein:
   each of said ground wheels has an inflatable, soft-walled, low pressure tire which under the weight of the catamaran is expandable axially at its ground-engaging tread to maintain a load of less than about 2 pounds per square inch on the tire thereat;
   and further comprising plastic anti-friction bearings engaged between the axle and each wheel to permit rotation of the axle within the wheels;
   and wherein said anti-friction bearings have metal races comprised of the axle and the rims and are needle bearings of self-lubricating plastic material due to wear and accumulation of plastic on said races.

2. A dolly according to claim 1, and further comprising retaining rings attached to the axle at the opposite ends of each needle bearing.

3. A dolly according to claim 2, and further comprising sleeves of rubber material on the outside of the axle axially outboard of the wheels.

4. A dolly according to claim 3, and further comprising a pair of chocks fastened to the axle at each end and each presenting a convex, annular, axially inboard face with a yieldable cover.

5. A dolly according to claim 4, wherein said cover is of outdoor carpeting.

6. A dolly according to claim 5, wherein said axle is a hollow elongated cylinder, and further comprising a flexible line extending lengthwise through the axle and beyond its opposite ends for releasable attachment to the catamaran hulls.

7. A dolly according to claim 1, wherein said axle is a hollow elongated cylinder, and further comprising a flexible line extending lengthwise through the axle and beyond its opposite ends for releasable attachment to the catamaran hulls.

8. A dolly according to claim 1, wherein each tire has chevron-shaped, outwardly projecting ribs spaced apart in succession along its circumference.

9. A dolly according to claim 8, and further comprising:
retainer rings attached to the axle at opposite ends of each needle bearing;
sleeves of rubber material on the outside of the axle axially outboard of the wheels;
and a pair of chocks fastened to the axle at each end and each presenting a convex, annular, axially inboard face with a cover of yieldable material.

10. A dolly according to claim 1, and further comprising sleeves of yieldable, frictional material on the outside of the axle axially outboard of the wheels.

11. A dolly according to claim 10, and further comprising a pair of annular chocks fastened to the axle axially outboard of said sleeves.

12. A dolly according to claim 11, wherein said axle is an elongated hollow cylinder, and further comprising a flexible line extending lengthwise through the axle and beyond its opposite ends for releasable attachment to the catamaran hulls.

* * * * *